United States Patent [19]

McCurry et al.

[11] 4,398,771
[45] Aug. 16, 1983

[54] BRAKING SYSTEM FOR TOWED VEHICLES

[76] Inventors: Walter W. McCurry; Walter G. Pettit, both of 8264 Tanoak Way, Citrus Heights, Calif. 95610

[21] Appl. No.: 208,483

[22] Filed: Nov. 19, 1980

[51] Int. Cl.³ .............................................. B60T 7/20
[52] U.S. Cl. .................................... 303/15; 188/3 R; 303/7
[58] Field of Search .................. 188/3 R, 3 H; 303/3, 303/7, 15

[56] References Cited

U.S. PATENT DOCUMENTS

| 2,169,668 | 8/1939 | Thomas | 188/3 R X |
| 2,711,228 | 6/1955 | Shank | 188/3 R |
| 3,117,822 | 1/1964 | Blair | 303/15 X |
| 3,768,870 | 10/1973 | Howard | 188/3 R X |

*Primary Examiner*—Duane A. Reger
*Attorney, Agent, or Firm*—Blair, Brown & Kreten

[57] ABSTRACT

A braking system for automatically braking a towed vehicle coupled to a towing vehicle having an electrical brake control circuit and a vacuum line wherein the towed vehicle is provided with a normally closed solenoid valve for connecting both a vacuum reservoir in the towed vehicle and the vacuum line in the towing vehicle with a vacuum responsive bellows operatively connected to the brake pedal in the towed vehicle with the solenoid operated valve electrically connected through a normally open breakaway switch to the battery whereby the operation of the braking system on the towing vehicle is accompanied by an actuation of the solenoid operated valve and the application of a vacuum to the bellows for concomitant operation of the brake pedal on the towed vehicle and upon a decoupling of the towed and towing vehicles, a similar actuation of the solenoid operated valve when the breakaway switch closes to apply vacuum to the bellows for actuation of the brake pedal to brake the decoupled towed vehicle.

11 Claims, 4 Drawing Figures

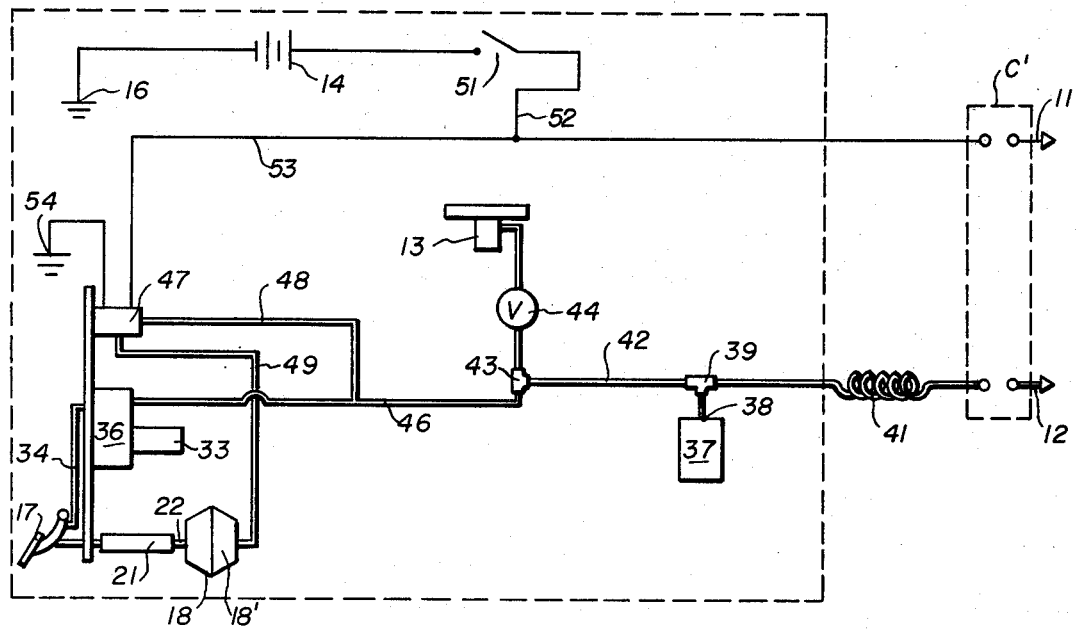
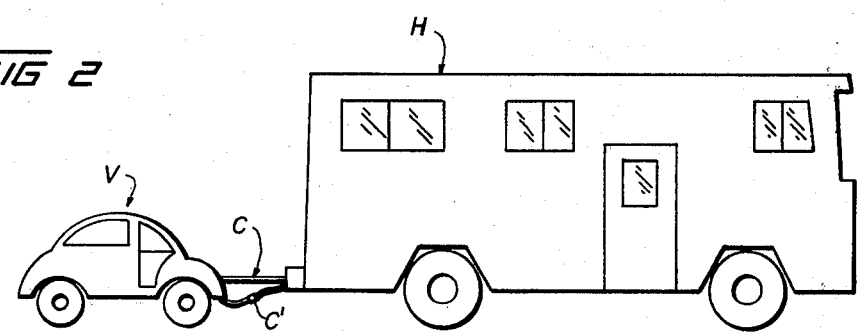
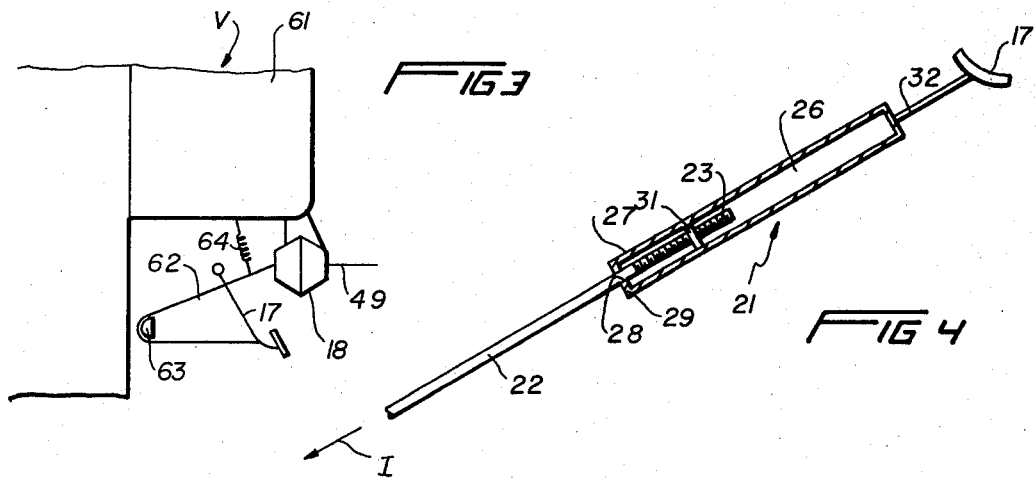

BRAKING SYSTEM FOR TOWED VEHICLES

BACKGROUND OF THE INVENTION

The need frequently arises to tow a motor vehicle with another vehicle for various reasons such as to transport a motor vehicle to another location, to provide an auxiliary means of transportation and the like. The common practice is to utilize a suitable coupling device by means of which the towed vehicle is connected detachably to the towing vehicle, such coupling devices being readily available commercially. By way of example, it is frequently desired by individuals utilizing motor homes which are primarily suitable for family use in long distance traveling to couple a family type automobile to the rear of such a motor home so that the motor vehicle is available for family use throughout the area in which the motor home is parked.

Various hazards are presented when such a motor vehicle is towed by such a vehicle as a motor home in that the bulk and weight of the motor home makes emergency stops for avoiding accidents and the like a difficult maneuever particularly due to the increased braking distance. The additional weight and momentum of the towed vehicle adds considerably to an emergency stop situation and unless the driver of the motor home is exceptionally careful, accidents under such emergency conditions are quite common. It has been proposed to provide a suitable arrangement whereby the braking of the towing vehicle is accompanied by a similar braking action in the towed vehicle thereby reducing the influence of the towed vehicle on the braking action in the towing vehicle. However, such present day braking arrangements are extremely complicated and expensive and fall short of the performance required for maximum effectiveness. Furthermore, the installation of such a braking system between a towing and towed vehicles requires extensive modification of the conventional braking system on the towed vehicle and additionally requires changes to be made for converting the braking system on the towed vehicle between conventional driving and towing operations.

Another serious hazard is encountered when towing a vehicle coupled to the towing vehicle. It is not uncommon for a coupling to fail so that the towed vehicle becomes detached from the towing vehicle leaving it free to wander in an unsteered condition at a relatively high rate of speed so that it is ultimately wrecked. While some couplings are provided with safety features such as chains or the like, this is no guarantee that such chains will also not break with resulting destruction of the towed vehicle.

A risk of major liability due to property damage, public hazard, or personal injury are possible when an individual has to perform winching operations alone with recreation vehicles, two trucks, and line trucks.

OBJECTS AND SUMMARY OF THE INVENTION

According, a primary object of this invention is to provide a new and novel braking system for a towed vehicle coupled to a towing vehicle in which the brakes in the towed vehicle are automatically applied during the application of the brakes in the towing vehicle.

Another object of this invention is to provide a new and novel automatic braking system for a towed vehicle coupled to a towing vehicle in which the brakes are actuated in the towed vehicle if the towed vehicle becomes uncoupled.

A further object of this invention is to provide a new and novel automatic braking system for a towed vehicle which is simple and inexpensive in construction, which uses both the braking system in the towing vehicle as well as the braking system in the towed vehicle either during normal towing operation or during an uncoupling of the towed vehicle.

Still another object of this invention is to provide a new and novel braking system for a towed vehicle which is not only actuated by the braking system in the towing vehicle but which permits the braking system in the towed vehicle to be operated in the normal manner when in the untowed condition.

Still another object of this invention is to provide a new and novel braking system for a towed vehicle coupled to a towing vehicle which is composed of a minimum of parts, which permits a conventional motor vehicle to be easily modified to accommodate the braking system of the invention and which is automatically interconnected with the braking system on the towing vehicle during the coupling of the towing vehicle to the towed vehicle.

The objects of the invention and other related objects are accomplished by the provision of vacuum responsive actuator means on a towed vehicle which is arranged to be detachably coupled to a towing vehicle having a vacuum line and a braking unit including an electrical control circuit. The towed vehicle which includes an engine, a battery and a braking arrangement having a brake pedal is provided with means to operatively connect the actuator means to the towed vehicle brake pedal and the towed vehicle is provided with a source of vacuum communicating by conduit means including a normally closed, solenoid operated valve with the actuator means. The circuit means on the towed vehicle also include a normally open breakaway switch for connecting the towed vehicle battery to the solenoid operated valve and means are provided for detachably connecting the circuit means and the conduit means to the electrical control circuit and vacuum line on the towing vehicle respectively in the coupled condition of the vehicles for energizing the solenoid operated valve and for supplying a vacuum to the actuator means to brake the towed vehicle during the braking of the towing vehicle. The breakaway switch is responsive to the uncoupling of the towed and towing vehicle for energizing the solenoid operated valve to apply a vacuum to the actuator means from the vacuum source for braking the towed vehicle.

Other objects and advantages will become apparent in the following specification when considered in light of the attached drawings.

BRIEF DESCRIPTION OF THE DRAWINGS

FIG. 1 is a schematic diagram of the automatic braking system of the invention;

FIG. 2 is a side elevation view showing the towing and towed vehicles in the coupled condition;

FIG. 3 is a schematic view of a modification of the automatic braking system of the invention; and FIG. 4 is a perspective view of a component part of the braking system of FIG. 1.

DESCRIPTION OF THE PREFERRED EMBODIMENT

Referring now to the drawings and to FIG. 1 in particular, there is shown a towing vehicle such as a motor home designated generally by the letter H to which is coupled, at the rear to a motor vehicle of conventional construction which is designated generally by the letter V. Any suitable commercially available coupling C may be used to couple the front of the motor vehicle V to the rear of the motor home H. FIG. 2 also shows a further coupling C' constructed in accordance with the invention and shown in broken lines in FIG. 1 by means of which the braking system on the towed vehicle V is coupled to the conventional electrical control circuit 11 and vacuum line 12 in the hydraulic braking unit on the towing vehicle H as will be explained hereinafter.

Referring now to FIG. 1, the towed vehicle V includes, as is well known, an engine (not shown) having a carburetor 13, a battery 14, the negative terminal which is connected to ground at 16, and a braking arrangement which includes a foot operated brake pedal 17. The braking system of the invention includes vacuum responsive actuator means on the towed vehicle V which, in the illustrated embodiment, includes a vacuum responsive device such as a bellows 18 having an interior 18'. Means are provided for operatively connecting the bellows 18 to the towed vehicle brake pedal 17 which includes an adjusting mechanism or linkage designated generally by the reference numeral 21 as shown best in FIG. 4. The adjusting mechanism or linkage 21 includes a rod 22 connected at one end to the bellows 18 and having a threaded opposite end portion 23 extending within the central bore 26 of a tubular member 27 having an open end 28 through which the threaded end of the rod 22 extends. The open end 28 of the tubular member 27 is provided with an annular shoulder 29 defining a stop which is arranged to be engaged by a nut 31 threadedly engaged with the threaded end portion 23 of the rod 22. The end of the tubular member 27 opposite the open end 28 is connected by means of an arm 32 to the brake pedal 17 so that the brake pedal 17 may be pedally manipulated in the conventional manner. Thus, the linkage 21 is provided with overriding means as an independent manipulation of the brake pedal 17 by an operator is permitted since the tubular member 27 slides freely relative to the rod 22 when the pedal 17 is depressed.

The towed vehicle V is provided with a conventional master brake cylinder 33 and is connected by the means of a linkage 34 to the brake pedal 17. In addition, a vacuum brake booster 36 of conventional construction is operatively associated with the master brake cylinder 33 as shown in FIG. 1.

A source of vacuum is provided on the towed vehicle V which, in the illustrated embodiment, includes a vacuum canister or reservoir 37 having an outlet 38 connected to one section of a one-way vacuum Tee 39. The vacuum Tee is connected also through a coiled air hose 41 to the coupling C' so that the air hose 41 is connected to the vacuum line 12 on the towing vehicle H. The vacuum Tee 39 is also connected by means of a conduit 42 to a second vacuum Tee 43, one side of which is connected through a flapper valve 44 to a vacuum connection on the engine carburetor 13. The opposite side of the vacuum Tee 43 is connected by means of a conduit 46 to the vacuum brake booster 36.

The braking system of the invention is provided with conduit means including a normally closed, solenoid operated valve for communicating the source of vacuum such as the canister 37 with the actuator means or bellows 18. More specifically, a solenoid operated valve 47 is connected on one side through a conduit 48 to the conduit 46 and, on the other side, by means of a conduit 49 connected to the opposite side of the bellows 18 from the rod 22 so as to communicate with the bellows interior 18'.

Circuit means are provided on the towed vehicle V including a normally open breakaway switch 51 connected to the positive side of the battery 14. The other side of the breakway switch 51 from the battery 14 is connected by a conductor 52 to a conductor 53 which is connected through the coil (not shown) of the solenoid operated valve 47 to ground at 54. The conductor 53 is also connected to the coupling C' so that in the coupled condition of the vehicle V, H conductor 53 is connected to the electrical control circuit 11 on the motor home H.

In the operation of the invention, the towed vehicle V is coupled to the towing vehicle such as a motor home H by means of couplings C, C'. In the coupled condition, conductor 53 is connected to the electrical control circuit 11 on the towing vehicle and the coiled hose 41 is connected to the vacuum line 12 on the towing vehicle. When the brakes on the towing vehicle H are applied, power is applied through conductor 53 to the solenoid operated valve 47 opening valve 47 so that the vacuum in the towing vehicle vacuum line 12 communicates with the interior 18' of the bellows 18. As a result of the application of a vacuum to the bellows interior 18', the bellows 18 contracts moving rod 22 in the direction of the arrow I (FIG. 4) to move the nut 31 into engagement with the stop 29 depressing the brake pedal 17 thereby applying the brakes simultaneously in the towed vehicle V.

In the event the coupling C becomes disconnected the breakaway switch 51 closes so that the solenoid operated valve 47 is again energized through the circuit including the battery 14 moving the valve 47 into the open position and applying a vacuum to the bellow's interior 18' to depress pedal 17. Thus, upon uncoupling of the towed vehicle V, the brakes in the towed vehicle V are automatically applied. It will be noted that in the event the towed vehicle V is to be operated independently of the towing vehicle, the flapper valve 44 is moved to the open position when vehicle V is operated automatically and moved to the off position when being towed. Furthermore, it should be understood that the vacuum brake booster 36 and the vacuum canister 37 contain sufficient vacuum to apply a vacuum to the bellows 18 in the event the towed vehicle becomes uncoupled from the towing vehicle H.

FIG. 3 shows a modification of the braking system of the invention wherein like numerals are utilized to identify like parts. In the modification of FIG. 3, the bellows 18 is mounted under the dashboard 61 of the towed vehicle V, the bellows being connected at one side by conduit 49 to the solenoid operated valve 47 as in the embodiment of FIG. 1 and on the opposite side through a cable 62 to the brake pedal 47. The cable 62 extends over a idler pulley 63 and cable 62 is connected by means of a spring 64 to the dashboard 61 to take up any slack which might be present in the cable 62.

Having thus described the preferred embodiment of the invention it should be understood that numerous structural modification and adaptations may be resorted to without departing from the spirit of the invention.

What is claimed is:

1. A braking system for automatically braking a towed vehicle having an engine, a battery and a braking arrangement including a brake pedal, the towed vehicle being detachably coupled to a towing vehicle also having an engine, battery and braking system and having a vacuum line using compressible fluid and a braking unit including an electrical control circuit comprising, in combination, vacuum responsive actuator means on said towed vehicle, means for operatively connecting said actuator means to said towed vehicle brake pedal, a source of vacuum on said towed vehicle, conduit means including a normally closed, solenoid operated valve for communicating said source of vacuum with said actuator means, circuit means on said towed vehicle including a normally open breakaway switch for connecting said towed vehicle battery to said solenoid operated valve, means for detachably connecting said circuit means and said conduit means to said control circuit and said vacuum line and said towing vehicle respectively in the coupled condition of said towed and towing vehicles for energizing said solenoid operated valve and supplying a vacuum to said actuator means to brake said towed vehicle during the braking of said towing vehicle, said breakaway switch being responsive to the uncoupling of said towed and towing vehicles for energizing said solenoid operated valve to apply a vacuum to said actuator means from said vacuum source for braking said towed vehicle should the towed vehicle be dissociated from the towing vehicle while being towed.

2. A braking system in accordance with claim 1 wherein said actuator means comprises a vacuum responsive device and means for operatively connecting said vacuum responsive device to said solenoid operated valve.

3. A braking system in accordance with claim 2 wherein said vacuum source comprises a reservoir on said towed vehicle and means for evacuating said reservoir to provide a vacuum therein.

4. A braking system in accordance with claims 3 wherein said means for evacuating said reservoir includes said towing vehicle vacuum line.

5. A braking system in accordance with claim 4 wherein fluid means for evacuating said reservoir further comprises a conduit having a on-off valve for connecting said conduit means to the vacuum in the engine of said towed vehicle.

6. A braking system in accordance with claim 3 wherein said vacuum responsive device comprises a bellows having an interior said bellows being movable into an expanded inoperative position in the absence of a vacuum in said interior and into a contracted operative position upon the presence of a vacuum in said interior and wherein said means for connecting said vacuum responsive device with said valve includes a conduit for communicating said bellows interior with said solenoid operated valve.

7. A braking system in accordance with claim 6 wherein said means for operatively connecting said actuator means to said towed vehicle brake pedal comprises a linkage connected between said vacuum responsive device and said brake pedal, said linkage including overriding means to permit manual movement of said brake pedal for braking said towed vehicle.

8. A braking system in accordance with claim 7 wherein said linkage comprises a rod connected at one end to said vacuum responsive device, said rod having a threaded portion adjacent the other end of said rod, a tubular member having a central bore connected at one end to said brake pedal, the other end of said tubular member having an opening defining a stop for insertion of said rod threaded end portion within said tubular member central bore and a nut adjustably positioned in threaded engagement with said threaded end portion within said central bore, said nut being engageable with said stop during the movement of said vacuum responsive device into said operative position for actuating said brake pedal and said tubular member being movable relative to said rod in overriding relationship therewith to permit manual actuation of said brake for braking said towed vehicle.

9. A braking system in accordance with claim 5 wherein said means for detachably connecting said circuit means and said conduit means to said control circuit and said vacuum line comprises a coupling and wherein said reservoir is provided with an outlet, a T-fitting including a one-way valve connected to said reservoir outlet, a conduit for connecting said T-fitting to said solenoid operated valve, a conduit having one end connected to said T-fitting and having the other end mounted on said coupling for connection to said towing vehicle vacuum line in the coupled condition of said towing and towed vehicles.

10. A braking system in accordance with claim 9 wherein said conduit for connecting said conduit means to said engine vacuum is connected at one end to said conduit between said solenoid valve and said T-fitting.

11. A braking system in accordance with claim 7 wherein said linkage comprises a cable connected at one end to said bellows and at the other end to said brake pedal and a pulley around which said cable extends in a U-shaped configuration between said bellows and said brake pedal and a spring fixed at one end and connected at the other end to said cable between said pulley and said bellows.

* * * * *